US 6,583,889 B1

(12) United States Patent
Koyanagi et al.

(10) Patent No.: US 6,583,889 B1
(45) Date of Patent: Jun. 24, 2003

(54) FACSIMILE APPARATUS AND PROGRAM REWRITING METHOD

(75) Inventors: Izumi Koyanagi, Ueda (JP); Nobuhiro Moteki, Chigasaki (JP); Suguru Tsuchiya, Karuizawa-machi (JP); Shinichi Mitaku, Ueda (JP); Takafumi Higuchi, Ueda (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/438,411

(22) Filed: Nov. 12, 1999

(30) Foreign Application Priority Data

Nov. 18, 1998 (JP) ............................. 10-328297

(51) Int. Cl.7 ................................. H04N 1/00
(52) U.S. Cl. ................. 358/1.16; 358/468; 358/434
(58) Field of Search ................. 358/404, 444, 358/468, 400, 1.16, 434, 406, 442, 1.17

(56) References Cited

U.S. PATENT DOCUMENTS 4,998,213 A * 3/1991 Suzuki ........................ 364/519
5,159,546 A * 10/1992 Inoue ........................ 364/146
6,041,205 A * 3/2000 Funada ........................ 399/196
6,459,504 B1 * 10/2002 Murano et al. ............. 358/406
2002/0048033 A1 * 4/2002 Tsukamoto ................ 358/1.12
2002/0051202 A1 * 5/2002 Kawai ....................... 358/1.16
2002/0103901 A1 * 8/2002 Yoshida ..................... 709/224

FOREIGN PATENT DOCUMENTS

| JP | 3-256128 | 11/1991 | |
| JP | 6-314202 | 11/1994 | ........... G06F/9/445 |
| JP | 8-328845 | 12/1996 | ............. G06F/9/06 |
| JP | 2000155687a | * 6/2000 | ........... G06F/9/445 |

OTHER PUBLICATIONS

English Language translation of JP–6–314202.
English Language translation of JP–8–328845.
English Language translation of JP–3–256128.

* cited by examiner

Primary Examiner—Jerome Grant, II
(74) Attorney, Agent, or Firm—Greenblum & Bernstein, P.L.C.

(57) ABSTRACT

At the time of rewriting a program provided in a facsimile apparatus using a memory card, a mode is changed by determining the content of the memory card and the presence and absence of a predetermined operation. Then, at the time of rewriting the program, the program is rewritten to a program stored in the memory card regardless of old and new versions, while the content of the memory card is erased as required.

14 Claims, 6 Drawing Sheets

| OFFSET | FORMAT | CONTENT | EXAMPLE OF SETTING |
|---|---|---|---|
| 0×00 | CHAR[32] | SYSTEM DATA CARD COMMON HEADER | 'MAGI casper balthasar melchior' |
| 0×20 | CHAR[16] | SYSTEM DATA CARD TYPE HEADER | 'Card boot Main1' |
| 0×30 | CHAR[16] | PROGRAM NAME | ex.'UF-ABC V0.00' |
| 0×40 | DWORD | PROGRAMMED DATE | ex.0x19980710 |
| 0×44 | DWORD | NUMBER OF REVISIONS ON THE PROGRAMMED DATE | ex.0x00000001 |
| 0×48 | WORD | CHECK SUM | ex.0x0f55 |
| 0×4a | WORD | INFORMATION FOR DEVELOPMENT | 0x0000 or 0xffff |
| 0×4c | WORD | COUNTRY CODE | 0x0014(If not defined 0xffff) |
| 0×4e | BYTE | OEM CODE | 0x01(If not defined 0xff) |
| 0×4f | BYTE | TYPE OF CODE | 0x01(If not defined 0xff) |
| 0×50 | WORD | MAIN CPU CONTROL DATA1 | ex.0x000f |
| 0×51 | PTR | EXECUTION ADDRESS AFTER BOOT | ex.0x0070063b |
| 0×52 | PTR | BOOT PROGRAM ADDRESS ON CARD | ex.0x0080064c |
| 0×5c | DWORD | BOOT PROGRAM SIZE | ex.0x00000200 |
| 0×60 | BYTE [0×20] | BACKUP | 0x00 |

FACSIMILE APPARATUS AND PROGRAM REWRITING METHOD

BACKGROUND OF THE INVENTION

1. Field of the Invention

The present invention relates to a facsimile apparatus capable of rewriting a program stored in a memory.

2. Description of the Related Art

Conventionally, in this type of facsimile apparatus, a program is rewritten to new one through a telephone network and a memory card having a program stored is inserted to a facsimile apparatus, whereby upgrading a version of the program provided in the facsimile apparatus. This type of system is proposed in Unexamined Japanese Patent Publication Hei No. 6-314202.

However, the conventional facsimile apparatus performs comparison between the version of the program provided in the facsimile apparatus and that of the program for rewriting from the memory card. The rewriting of program is executed only when the version of the program for rewriting is newer than that of the program provided in the facsimile apparatus as a result of the comparison. For this reason, in the case where the program is stored in an uncompleted state by an error which occurs when a new program is transferred to the interior of the facsimile apparatus, there occurs a problem in which the rewriting of the program of the same version cannot be carried out.

Moreover, in the facsimile apparatus, the number of usable buttons other than a 10-button keypad for use in calling a telephone number is limited. Unlike the personal computer, it is impossible to input various kinds of commands. therefore, at the time of rewriting a program from a memory card, etc., a code number, etc. predefined for rewriting must be input from 10-button keypad to set the facsimile apparatus to a program rewrite mode, whereby rewriting the program. This makes the rewriting work complicated. The above-mentioned code number is a special one in which numerals are combined at random and such a special number is not a command in which a special meaning can be imaged from the combination. This causes an operation error to be easily generated and makes the operation complicated. Particularly, in a recent facsimile apparatus, which aims to improve its capability by rewriting a program, the program rewriting operation is frequently carried out. For the reason of the complicated operation, the program rewriting operation cannot be smoothly performed.

Moreover, at the time of rewriting the program, there is a case in which a memory card clearing operation is required in addition to the program rewriting operation for reasons of serviceman's work. In such a case, the serviceman must carry a special device for clearing the memory card extra, resulting in real inconvenience for serviceman. Also, even if a capability of clearing the content of the memory card is provided in the facsimile apparatus, there are problems in which a special operation must be done to change a program rewrite mode to a memory card clearing mode and this operation becomes complicated.

SUMMARY OF THE INVENTION

It is an object of the present invention to provide a facsimile apparatus, which is capable of changing a normal mode, a mode of rewriting a program and a mode of clearing a memory card with a simple operation so as to surely perform a program rewriting and a memory card clearing without having any erroneous operation.

Specifically, according to the present invention, there is provided a facsimile apparatus for receiving and transmitting an image through a communication network, comprising:

a memory for storing a program for controlling the facsimile apparatus:
  CPU for executing processing for rewriting the program stored in the memory;
  a panel to which an instruction to the CPU can be input;
  an original sensor for detecting the presence or absence of an original; and
  a slot to which a memory card storing a program and other data is able to insert;
  wherein the CPU executes processing for rewriting the program stored in the memory to the program stored in the memory card when detecting that the memory card is inserted to the slot and that the original sensor is turned on at the time when the facsimile apparatus is powered on. Processing to be executed is changed by determining the insertion of the memory card and the presence and absence of the detection of the original by the original sensor. Then, at the time of rewriting the program, the program is rewritten to a program stored in the memory card regardless of old and new versions, while the content of the memory card is erased as required.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

An embodiment of the present invention will be specifically described with reference to the accompanying drawings.

Figure 1:
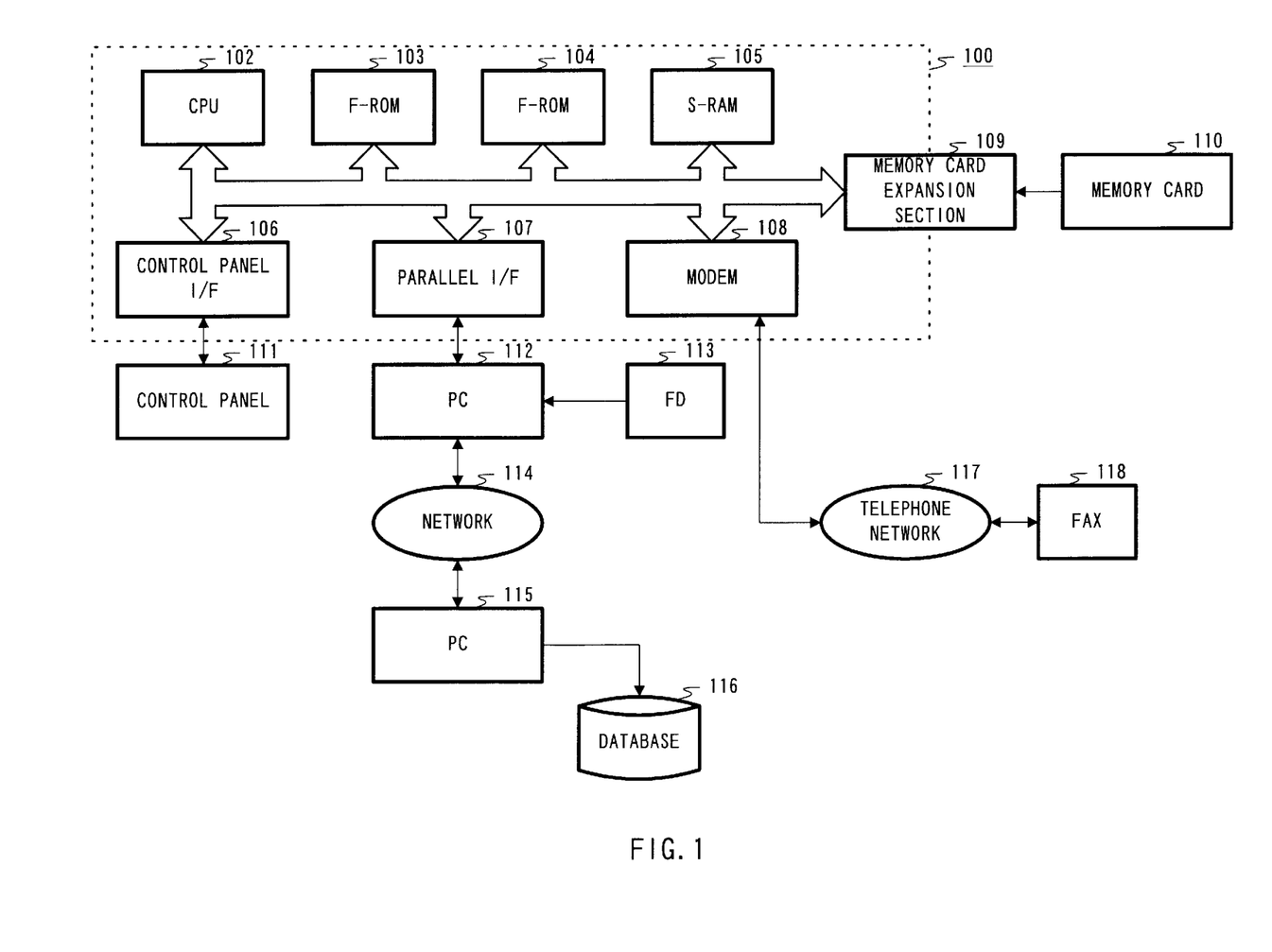
FIG. 1 is a block diagram showing an outline configuration of a facsimile apparatus according to an embodiment of the present invention.

FIG. 1 is a block diagram showing an outline configuration of a facsimile apparatus according to an embodiment of the present invention. A facsimile apparatus 100 according to one embodiment of the present invention comprises control bus 101 through which data communications with each configuration part is performed. In other words, CPU 102, flash ROM 103, flash ROM 104, and SRAM 105 are connected to control bus 101. CPU 102 controls the entirety of facsimile apparatus 100 based on a program to be described later and a command, etc. to be input from a control panel. Flash ROM 103 stores a program, which this CPU 102 executes. Flash ROM 103 is configured to be able to be rewritten. Flash ROM 104 stores image data, which is read by facsimile apparatus 100, and image data, which is received through communications. SRAM 105 temporarily stores data such that CPU 102 executes a program.

Also, control panel I/F 106, parallel I/F 107, modem 108, and memory card expansion section 109 are connected to control bus 101. Control panel I/F 106 performs communications of such as command data, status data, and rewriting data between control panel I/F 106 and a control panel to be described later. Parallel I/F 107 performs data reception and transmission between a personal computer (hereinafter referred to as "PC") and parallel I/F 107. Modem 108 carries out facsimile communications and Internet communications via a telephone network. Memory card expansion section 109 is used to expand memories for storing image data. A memory card, which is configured by a recording medium such as F-ROM, is loaded and unloaded onto this memory card expansion section 109 to input data.

Control panel 111 is connected to control panel I/F 106. A user inputs a mode instruction and a rewrite instruction from control panel 111. Control panel 111 has a display section, which can display predetermined information based on control of CPU 102. PC 112 is connected to parallel I/F 107. This allows PC 112 to perform data communications with facsimile apparatus 100. PC 112 inputs data from FD 113. This FD 113 is a recording medium including a floppy disc, an MD (mini disc), an MO (Magneto optic), etc. Also, PC 112 is connected to network 114 such as LAN, Internet, etc. This allows PC 112 to perform data communications with PC 115 set up at a distant location. PC 115 can also extract necessary data from database 116.

Modem 108 is connected to telephone network 117 through which facsimile apparatus 100 performs G3 communication and Internet communication. This allows facsimile apparatus 100 to perform facsimile communication with FAX 118 set up at a distant location and Internet communication therewith.

Moreover, facsimile apparatus 100 comprises a scanner for scanning an original. Then, the scanner has an original sensor for detecting the presence or absence of an original. This original sensor is turned on when detecting that the original is placed at an original scanning position, and turned off when detecting that no original is placed.

Facsimile apparatus 100 is also connected to commercial AC power through a power cable. Then, a power switch (not shown) provided in facsimile apparatus 100 is changed from an off state to an on state, so that power is supplied to facsimile apparatus 100 (a state in which power is supplied is hereinafter referred to as "power on state"). Also, when the power switch is changed from an on state to an off state, so that supply of power to facsimile apparatus 100 is interrupted (a state in which power is interrupted is hereinafter referred to as "power off state").

Figure 2:
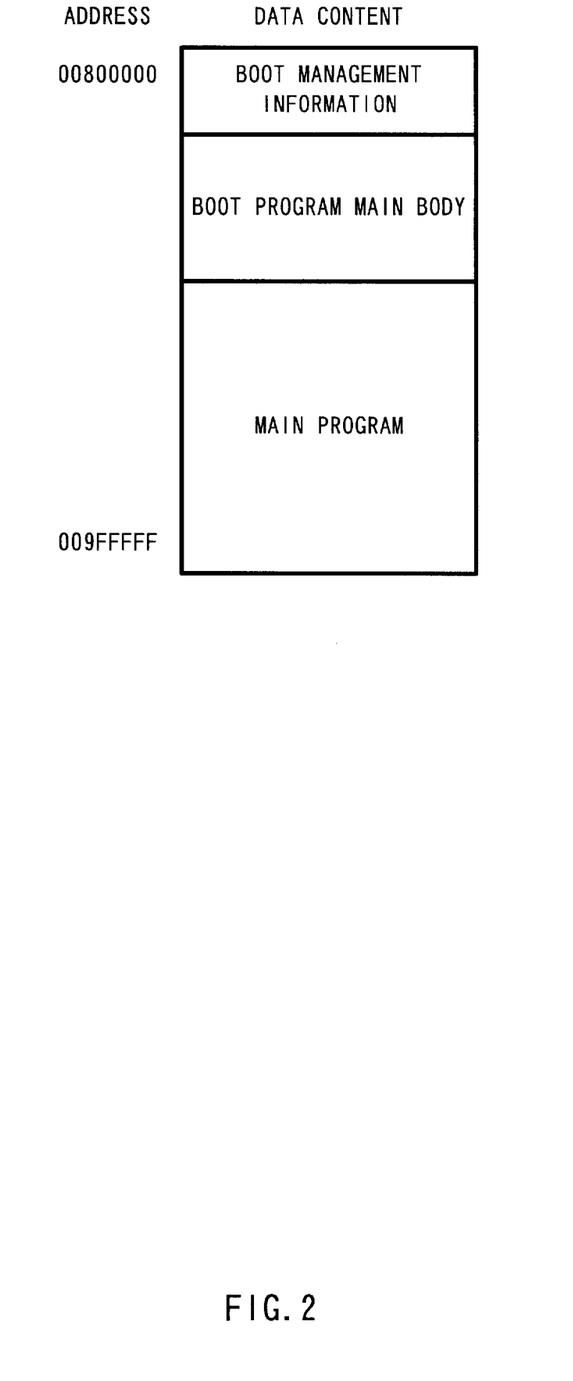
FIG. 2 is a conceptual view showing a memory space setting state in a memory card according to the embodiment of the present invention.
Figure 3:
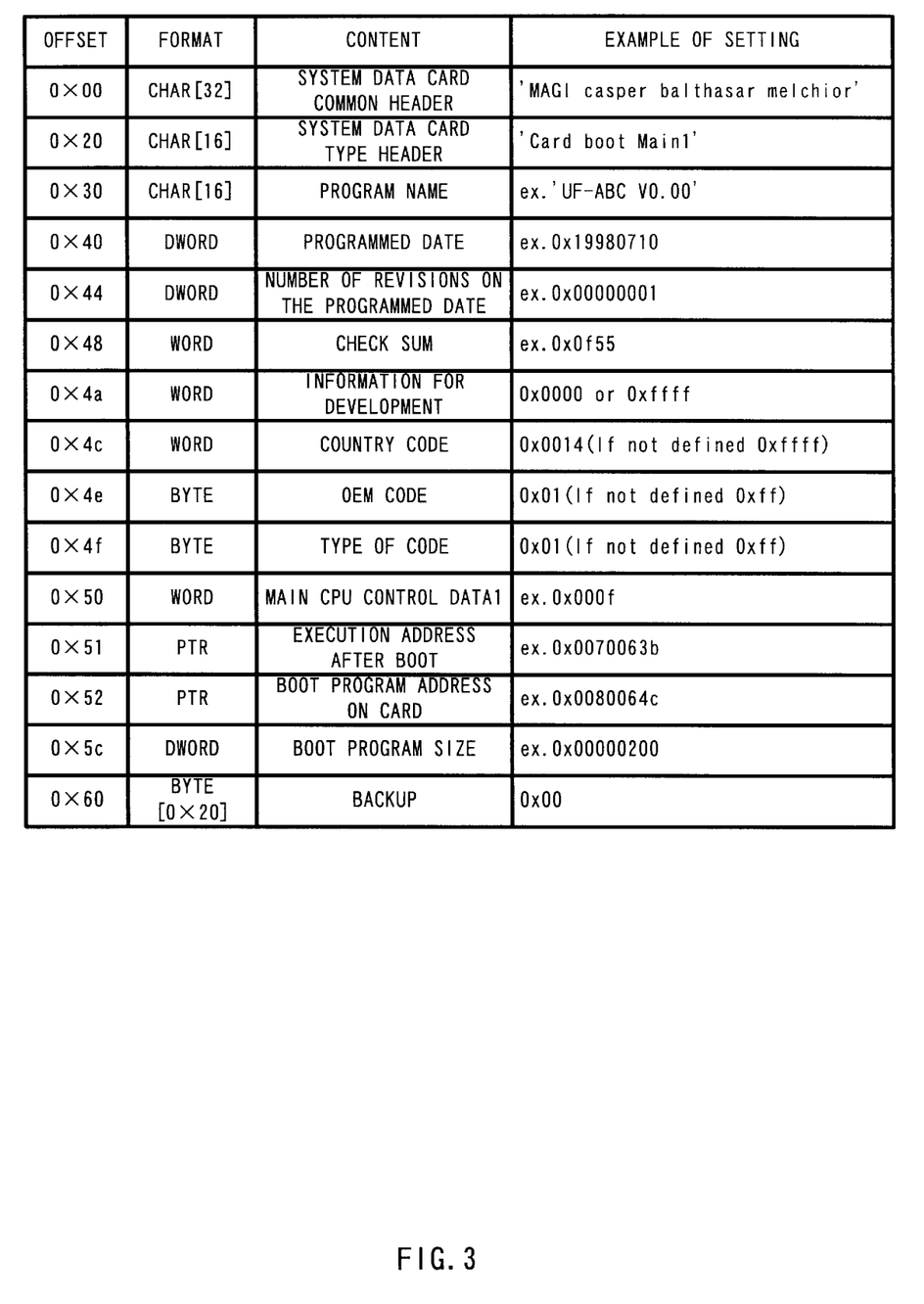
FIG. 3 is a conceptual view showing the content of boot management information in the memory card according to the embodiment of the present invention.

Next, an explanation is given of setting the memory space in memory card 110 with reference to FIGS. 2 and 3.

FIG. 2 is a conceptual view showing a memory space setting state in memory card 110. In the memory space, there are stored "boot management information", "boot program main body" which is one that is used in transferring the program and "main program", which is one that is transferred, up to address 009FFFFF in order of address 00800000. The details about this "boot management information" are shown in FIG. 3. FIG. 3 is a conceptual view showing the content of "boot management information". According to the content of "boot management information", a "system data card common header" indicates that this memory card is an information storage card of some type. "System data card type header" indicates that this memory card is a boot card of the main program, and defines backup information data and option program data, etc.

Also, a "program name" is information including a type of apparatus, a version name. A "programmed date" is a date when a program is programmed. A "number of revisions on the programmed date" is management information when a revision is carried out with the same version on the same date. Also, a "check sum" is a check sum value of transfer program. "Information for development" is "0xffff" at the time of development, and "0x0000" at the time of use at the market. Also, a "country code" is product expand country information. A "OEM code" indicates product supply destination information.

Also, "main CPU control data 1" is hard control information. A "post-boot execution address" shows a program start address of a FAX side, which is executed after a new program boot. Moreover, a "boot program address on a card" indicates a start address of a boot program main body in the memory card. A "boot program size" shows a size of a boot program stored in the memory card.

Figure 4:
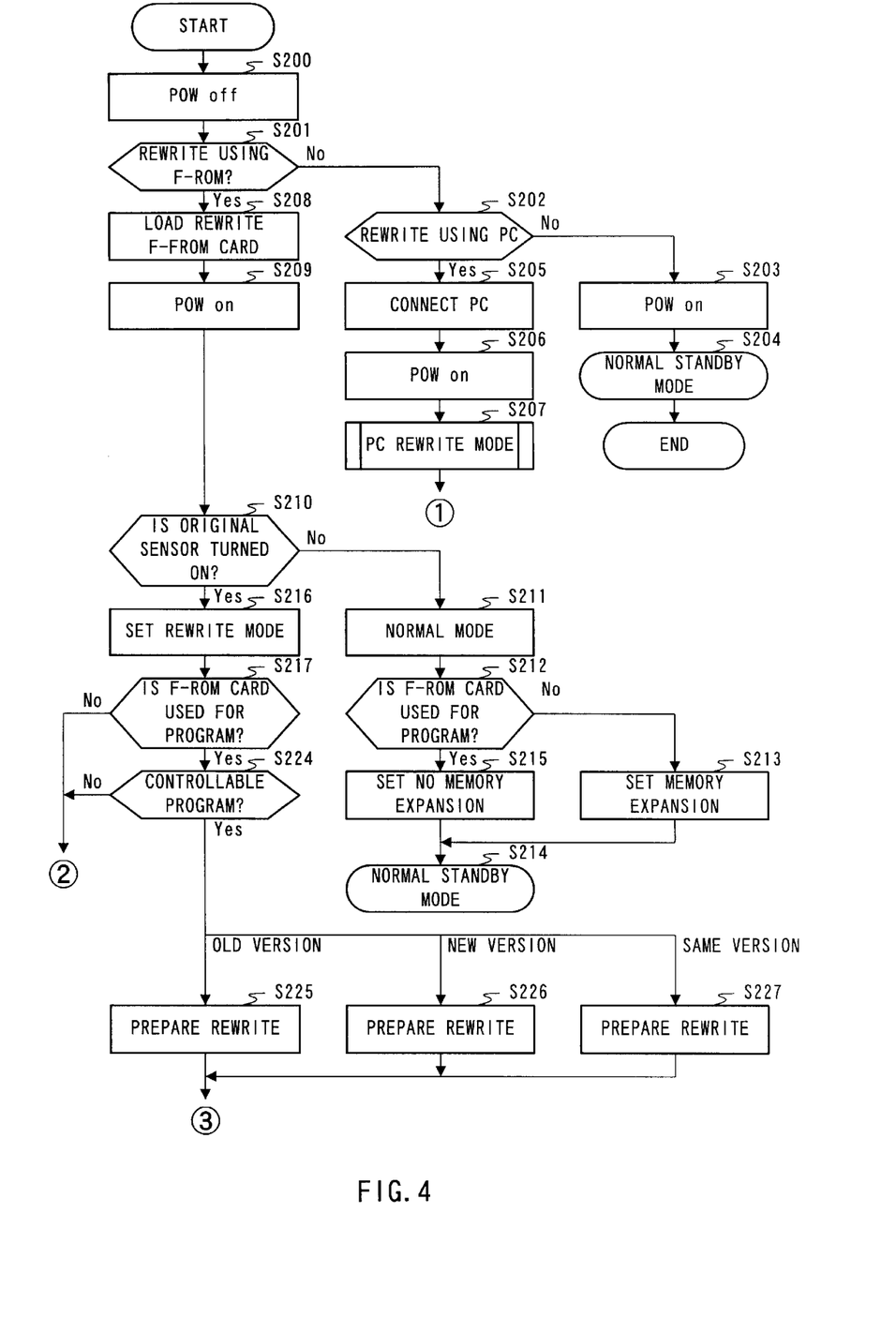
FIG. 4 is an operation flowchart at the time when the facsimile apparatus according to the above embodiment rewrites a program.
Figure 5:
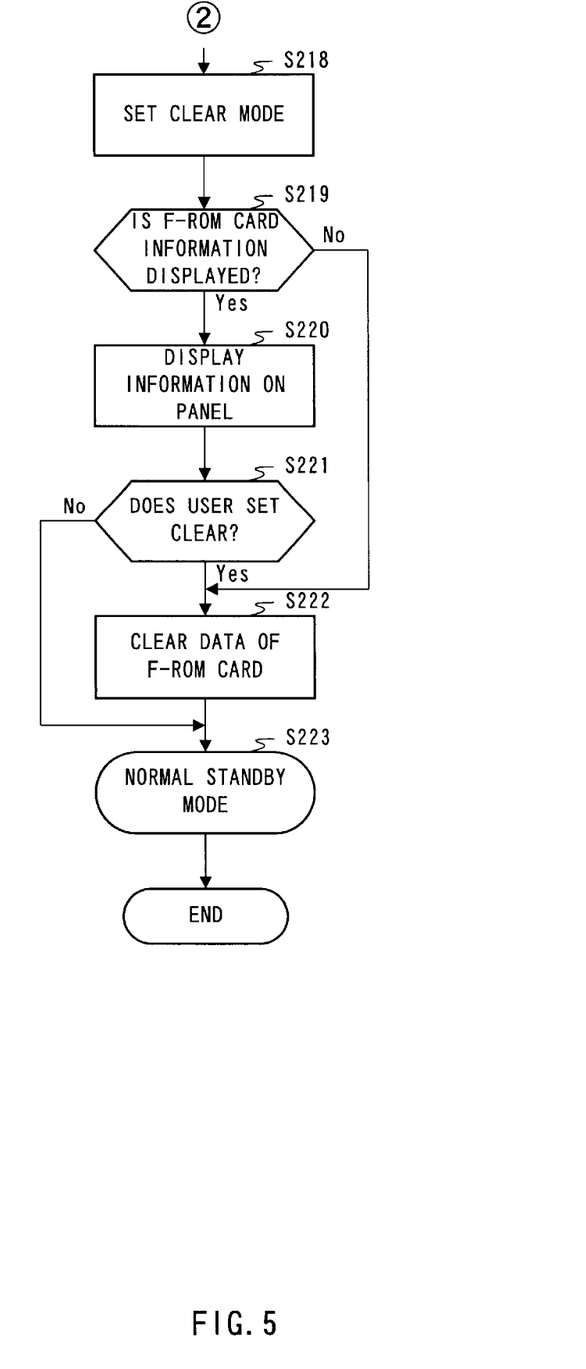
FIG. 5 is an operation flowchart at the time when the facsimile apparatus according to the above embodiment rewrites a program.
Figure 6:
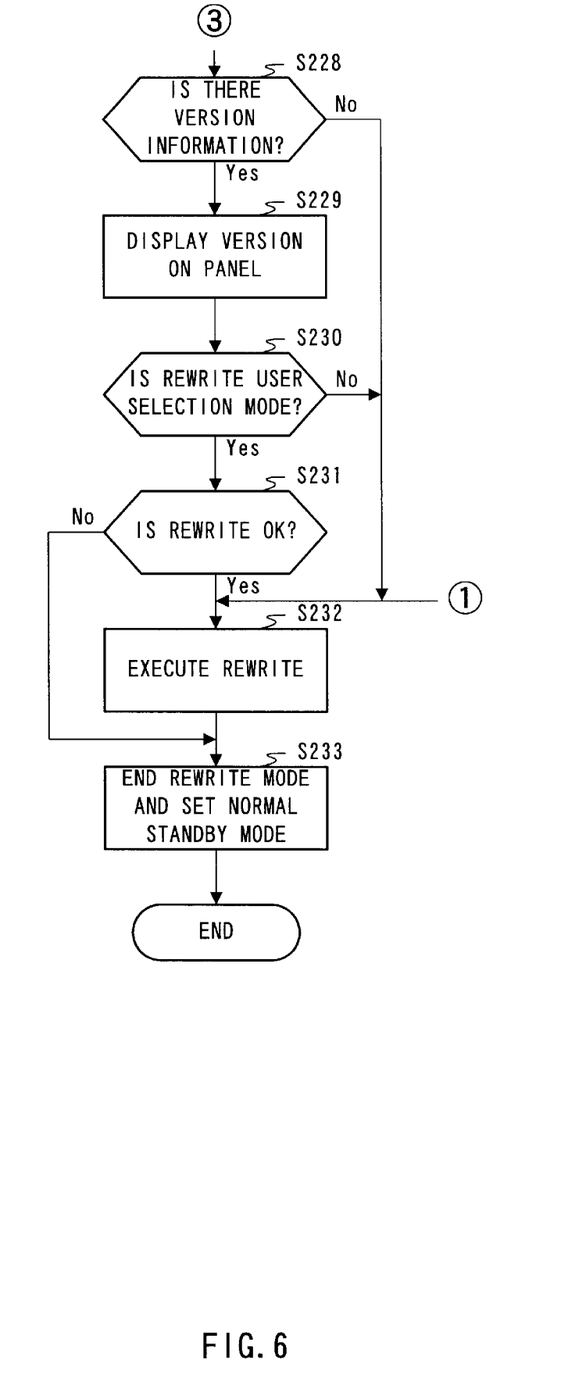
FIG. 6 is an operation flowchart at the time when the facsimile apparatus according to the above embodiment rewrites a program.

Next, the following will explain an operation, which is performed when the above-configured facsimile apparatus according to the embodiment of the present invention rewrites a program, with reference to FIGS. 4 and 5.

FIGS. 4 and 5 are operation flowcharts each showing a case when the above-configured facsimile apparatus according to the embodiment of the present invention rewrites a program. First of all, in a state in which the facsimile apparatus is powered off (step 200 (hereinafter referred to as "S200")), CPU 102 determines whether or not rewriting should be carried out using F-ROM (S201). Then, if rewriting is not carried out using F-ROM, CPU 102 determines whether or not rewriting should be carried out using PC (S202). As a result of the determination, if power is turned on when no rewriting is carried out using PC (S203), a normal standby mode is set (S204).

If rewriting is carried out using PC in S202, CPU 102 connects facsimile apparatus 100 to PC through parallel I/F107 (S205). At this time, when power is turned on (S206), a PC rewrite mode is set (S207). Then, rewriting is carried out using PC (S232).

Also, if rewriting is carried out using F-ROM in S201, an F-ROM card for rewriting is loaded (S208). At this time, when power is turned on (S209), CPU 102 determines whether or not the original sensor is turned on (S210). As a result of the determination, if the original sensor is not turned on, a normal mode is set (S211). Then, CPU 102 determines whether or not the loaded F-ROM card is one that is used for a program (S212). If the F-ROM card is not one that is used for a program, a memory extension is set (S213). Then, a normal standby mode is set (S214). Also, if the F-ROM card is one that is used for a program in S212, no memory extension is set (S215), and the normal standby mode is set (S214).

Thus, when the F-ROM card, which is not used for a program, is loaded, and the original sensor is turned off, the memory extension is set. For this reason, F-ROM card loaded onto facsimile apparatus 100 can be effectively use.

Also, when the original sensor is turned on in S210, a rewrite mode is set (S216). Thus, based on the on/off state of the original sensor, that is the existing scanner which is not used at the time when facsimile apparatus 100 is powered on, whether a mode is a normal mode or a rewrite mode is determined so as to set a mode. This eliminates the need for providing special operation buttons. Therefore, the mode change can be easily performed without increasing the number of parts and causing an increase in cost.

Next, CPU 102 determines whether or not F-ROM card is one that is used for a program (S217). As a result of the determination, if F-ROM card is not one that is used for a program, processing moves to processing shown in FIG. 5. In other words, a clear mode is set (S218).

Thus, a mode setting of three kinds of modes, that is, a normal mode, a rewrite mode, a clear mode, is determined based on the on/off state of the original sensor, that is, the existing scanner, which is not used at the time when facsimile apparatus 100 is powered on, and information of whether or not F-ROM card is one that is used for a program. This allows the mode change to be smoothly carried out with a simple operation without performing a complicated operation such as input of code number even in the facsimile apparatus having the number of using buttons limited.

Next, CPU 102 determines whether or not information of F-ROM card can be displayed on control panel 111 (S219). As a result of this determination, if information of F-ROM card can not be displayed on control panel 111, processing moves to S222. Then, data of F-ROM card is cleared (S222). Then, a normal standby mode is set (S223).

Thus, in the present facsimile apparatus, data of F-ROM card can be cleared. This eliminates the need for providing a special apparatus for clearing data of F-ROM card at the time of rewriting the program provided in the facsimile apparatus.

In S219, if information of F-ROM card can be displayed on control panel 111, information is displayed on the panel (S220). Then, CPU 102 determines whether or not a user sets the clear (S221). If the user does not set the clear, processing moves to S223. Then, a normal standby mode is set (S223). Also, in S221, if the user sets the clear, data of F-ROM card is cleared (S222). Then, a normal standby mode is set (S223).

Thus, only when F-ROM card, which is not used for a program, is loaded and the original sensor is turned on, data of F-ROM card is cleared. This makes it possible to clear data of F-ROM card even if processing for changing a mode is not particularly carried out.

Also, in S217, if F-ROM card is used for a program, CPU 102 determines whether or not the program is one that can control facsimile apparatus 100 (S224). As a result of the determination, if the program is not one that can control facsimile apparatus 100, processing moves to S218. Namely, processing moves to a clear mode.

Thus, if the program stored in F-ROM card can not control facsimile apparatus 100, processing moves to a clear mode. This prevents the program that can not control facsimile apparatus 100 from being erroneously rewritten. Also, in this case, data of F-ROM card is cleared. This eliminates the need for inputting a special code number, etc. for clearing data of F-ROM card. This makes it possible to simplify the operation to prevent an erroneous operation.

While, if the program is one that can control facsimile apparatus 100, CPU 102 performs preparations for a rewrite regardless of whether the program is an old version, a new version, or the same version (S225 to S227). This makes it possible to rewrite the program when the user finds a bug in a new version and wishes the program to be returned to the old version or when the user fails in transferring the program to a new version and wishes the program to be transferred to the same version again.

In S225 to 227, if preparations for a rewrite are made, CPU 102 determines whether or not version information is included in the program (S228). If no version information is included therein, the rewrite of program is executed (S232).

If version information is included therein, version information is displayed on control panel 111 (S229). Then, CPU 102 determines whether or not the rewrite of program is a user selection mode (S230). If the rewrite of program is not the user selection mode, the rewrite of program is executed (S232).

If the rewrite of program is the user selection mode, CPU 102 determines whether or not the rewrite of program is OK (S231). As a result, if the rewrite of program is not OK, CPU 102 ends a rewrite mode. Then, a normal standby mode is set (S233). While, if the rewrite of program is OK, the rewrite of program is executed (S232). Then, CPU 101 ends a rewrite mode. Thereafter, a normal standby mode is set (S233).

Thus, only when F-ROM card that is used for a program is loaded and the original sensor is turned on, the rewrite of program is executed. This makes it possible to rewrite the program even if processing for changing a mode is not particularly performed.

If version information is included in the program, version information is displayed on control panel 111. Therefore, the user can confirm version information of program to be rewritten. This makes it possible to execute the rewrite only when it is determined that there is a necessity to perform the rewrite. For this reason, it is possible to prevent an erroneous rewrite from being performed.

As is obvious from the above explanation, according to the present invention, the mode is changed by determining the content of the inserted memory card and the presence or absence of a predetermined operation at the time of rewriting the program provided in the facsimile apparatus. For this reason, it is possible to change the normal mode, the mode for rewriting a program, the mode for clearing the memory card with a simple operation, so that the rewrite of program and the clear of memory card can be surely performed without causing an erroneous operation.

The present invention is not limited to the above described embodiments, and various variations and modifications may be possible without departing from the scope of the present invention.

This application is based on the Japanese Patent Application No.HEI10-328297 filed on Nov. 18, 1998, entire content of which is expressly incorporated by reference herein.

What is claimed is:

1. A facsimile apparatus for receiving and transmitting an image through a communication network, comprising:
    a memory for storing a program for controlling said facsimile apparatus:
    CPU for executing processing for the program stored in said memory;
    a panel to which an instruction to said CPU can be input; and
    a slot to which a memory card storing a program and other data is able to insert,
    wherein said CPU determines whether or not the content of said memory card is a program when detecting that said memory card has been inserted to said slot and that a predetermined operation has been performed at the time when said facsimile apparatus is powered on, and when the content of said memory card is no program, said CPU executes processing for erasing the content of said memory.

2. The apparatus according to claim 1, wherein said CPU determines whether or not the content of said memory card is a program, and when the content of said memory card is no program or a program that exerts no control on said facsimile apparatus, said CPU executes processing for erasing the content of said memory card.

3. The facsimile apparatus according to claim 1, wherein at the time of executing processing for erasing the content of said memory card, said CPU executes processing for informing an operator of the content of said memory card, thereafter executing processing for erasing the content of said memory card.

4. The facsimile apparatus according to claim 1, wherein at the time of executing processing for erasing the content of said memory card, said CPU executes processing for informing an operator of the content of said memory card, and executes processing for erasing the content of said memory card after an instruction of erasing is input from said panel.

5. The facsimile apparatus according to claim 1, wherein said CPU determines whether or not the content of said memory card is a program, and when the content of said memory card is a program, said CPU executes processing for rewriting the program stored in said memory to the program stored in said memory card.

6. The facsimile apparatus according to claim 1, wherein said CPU recognizes an operation for enabling a capability of a non-use sensor when said facsimile apparatus is powered on as said predetermined operation.

7. A facsimile apparatus for receiving and transmitting an image through a communication network, comprising:
   a memory for storing a program for controlling said facsimile apparatus:
      CPU for executing processing for rewriting the program stored in said memory;
      a panel to which an instruction to said CPU can be input; and
      a slot to which a memory card storing a program and other data is able to insert;
   wherein said CPU determines whether or not the content of said memory card is a program when detecting that said memory card has been inserted to said slot and that no predetermined operation has been performed at the time when said facsimile apparatus is powered on, and when the content of said memory card is no program, said CPU executes processing for using said memory card as an extension memory.

8. A method for rewriting a program stored in a memory to control a facsimile apparatus, comprising the steps of:
   detecting that a memory card having a program and other data stored has been inserted and an original sensor for detecting the presence and absence of an original has been turned on when said facsimile apparatus is powered on; and
   rewriting the program stored in said memory to the program stored in said memory card.

9. A facsimile apparatus for transmitting image data through a communication network, comprising:
   a memory configured to store a program for controlling the facsimile apparatus;
   a CPU configured to overwrite the program stored in said memory;
   a scanner configured to scan a document to obtain the image data; and
   a document sensor configured to detect at least one of presence and absence of a document; and
   a opening configured to accept therein a computer-readable medium that stores data including a program;
   wherein said CPU is configured to overwrite the program stored in said memory with the program stored in the computer-readable medium only when:
      the computer-readable medium is present in said opening;
      power of the facsimile apparatus is on; and
      said document sensor detects the presence of a document.

10. The facsimile apparatus according to claim 9, wherein said CPU is configured to:
   determine whether a program is stored in the computer-readable medium before writing over the program stored in said memory; and
   start to overwrite the program stored in said memory with the program stored in the computer-readable medium, when a program is stored in the computer-readable medium.

11. The facsimile apparatus according to claim 9, wherein said CPU is configured to:
   indicate execution of an overwriting process;
   display a version of the program stored in the computer-readable medium, before said CPU begins to overwrite the program stored in said memory.

12. The facsimile apparatus according to claim 11, wherein said CPU is configured to start to overwrite the program stored in said memory with the program stored in the computer-readable medium, after inputting of an overwrite instruction.

13. The facsimile apparatus according to claim 9, wherein the computer-readable medium comprises a memory card.

14. A method for rewriting a program stored in a memory to control a facsimile apparatus, the method comprising:
   detecting that a computer-readable medium storing data including a program has been inserted;
   detecting, with a document sensor, at least one of presence and absence of a document, when the facsimile apparatus is powered on; and
   rewriting the program stored in the memory to the program stored in the computer-readable medium.

* * * * *